(12) United States Patent
Iwaasa

(10) Patent No.: US 7,168,079 B2
(45) Date of Patent: Jan. 23, 2007

(54) DISK APPARATUS WITH IMPROVED DRIVING MECHANISM

(75) Inventor: Hiroaki Iwaasa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 409 days.

(21) Appl. No.: 10/768,679

(22) Filed: Feb. 2, 2004

(65) Prior Publication Data

US 2004/0158845 A1  Aug. 12, 2004

(30) Foreign Application Priority Data

Feb. 3, 2003 (JP) ............... 2003-000495 U

(51) Int. Cl.
  *G11B 17/04* (2006.01)
(52) U.S. Cl. .................. 720/602; 720/607
(58) Field of Classification Search ............ 720/602, 720/607, 605
  See application file for complete search history.

(56) References Cited

U.S. PATENT DOCUMENTS

| | | | | |
|---|---|---|---|---|
| 5,636,198 A | * | 6/1997 | Maeng | 369/30.98 |
| 5,959,956 A | * | 9/1999 | Takishima | 720/607 |
| 6,208,606 B1 | * | 3/2001 | Saito | 720/609 |
| 6,339,575 B1 | * | 1/2002 | Suzuki | 720/607 |
| 6,567,370 B1 | | 5/2003 | Weisser | 369/244 |
| 6,590,849 B1 | * | 7/2003 | Yamauchi et al. | 720/607 |
| 2005/0081221 A1 | * | 4/2005 | Fukasawa | 720/607 |

FOREIGN PATENT DOCUMENTS

| | | | |
|---|---|---|---|
| JP | 7-45041 | | 12/1995 |
| JP | 08255395 A | * | 10/1996 |
| JP | 2000-011511 | | 1/2000 |
| JP | 2002-511629 | | 4/2002 |
| JP | 2002-216442 | | 8/2002 |

* cited by examiner

*Primary Examiner*—Brian E. Miller
(74) *Attorney, Agent, or Firm*—Morgan, Lewis & Bockius, LLP

(57) ABSTRACT

A disk apparatus includes a tray that moves with respect to a chassis fixed to an apparatus body to carry a disk, a drive unit that moves in a direction substantially orthogonal to the carrying direction of the tray with respect to the chassis to mount or dismount the disk placed on the tray, a pickup unit provided on the drive unit and having an optical pickup for recording or reproducing the disk, the pickup unit being movable in a radial direction of the disk, and a motor which is arranged on the drive unit and drives the drive unit, pickup unit and tray through a plurality of gears. A worm gear is attached to a motor shaft of the motor. Lead angle of the worm gear is set at 15°–30°.

11 Claims, 8 Drawing Sheets

FIG. 8

| COMPONENT NAME | WORM GEAR | DECELERATION GEAR | | | | FLAT GEAR | FLAT GEAR | FLAT GEAR | FLAT GEAR | TRAY GEAR | |
|---|---|---|---|---|---|---|---|---|---|---|---|
| | | WORM W | WORM W | WORM W | FLAT GEAR | | | | | FLAT GEAR | FLAT GEAR |
| SYMBOL | 8 | 9a | 9b | 10a | 10b | 11 | 12 | 13 | 14a | 14b |
| MODULE (m) | 0.3 | 0.3 | 0.5 | 0.3 | 0.7 | 0.7 | 0.7 | 0.7 | 0.7 | 1 |
| NUMBER OF STRIPS AND TEETH (Z PIECES) | 3 | 90 | 14 | 74 | 14 | 33 | 14 | 18 | 14 | 14 |
| PITCH CIRCLE DIAMETER (PCD mm) | 3 | 28.3 | 7 | 23.27 | 9.8 | 23.1 | 9.8 | 12.6 | 9.8 | 14 |
| PRESSURE ANGLE ($\alpha n°$) | 20 | 20 | 20 | 20 | 20 | 20 | 20 | 20 | 20 | 20 |
| LEAD ANGLE (°) | 17.458 | 17.458 | | 17.458 | | | | | | |
| ROTATION ANGLE FOR EACH ROTATION OF WORM (°) | 360 | 12 | 12 | 14.59 | 14.59 | 6.19 | 14.59 | 11.35 | 14.59 | 14.59 |
| ROTATION QUANTITY FOR EACH ROTATION OF WORM (°) | | 2.964 | 0.733 | 2.964 | 1.248 | 1.248 | 1.248 | 1.248 | 1.248 | 1.783 |

FIG. 9

| COMPONENT NAME | WORM GEAR | DECELERATION GEAR | | | | FLAT GEAR | FLAT GEAR | FLAT GEAR | FLAT GEAR | TRAY GEAR | |
|---|---|---|---|---|---|---|---|---|---|---|---|
| | | WORM W | WORM W | WORM W | FLAT GEAR | | | | | FLAT GEAR | FLAT GEAR |
| SYMBOL | 8 | 9a | 9b | 10a | 10b | 11 | 12 | 13 | | 14a | 14b |
| MODULE (m) | 0.3 | 0.3 | 0.5 | 0.3 | 0.7 | 0.7 | 0.7 | 0.7 | | 0.7 | 1 |
| NUMBER OF STRIPS AND TEETH (Z PIECES) | 3 | 90 | 14 | 71 | 14 | 33 | 14 | 18 | | 14 | 14 |
| PITCH CIRCLE DIAMETER (PCD mm) | 3 | 28.8 | 7 | 22.7 | 9.8 | 23.1 | 9.8 | 12.6 | | 9.8 | 14 |
| PRESSURE ANGLE (αn°) | 20 | 20 | 20 | 20 | 20 | 20 | 20 | 20 | | 20 | 20 |
| LEAD ANGLE (°) | 20.252 | 20.252 | | 20.252 | | | | | | | |
| ROTATION ANGLE FOR EACH ROTATION OF WORM (°) | 360 | 12 | 12 | 15.21 | 15.21 | 6.45 | 15.21 | 11.83 | | 15.21 | 15.21 |
| ROTATION QUANTITY FOR EACH ROTATION OF WORM (°) | | 3.014 | 0.733 | 3.014 | 1.301 | 1.301 | 1.301 | 1.301 | | 1.301 | 1.858 |

DISK APPARATUS WITH IMPROVED DRIVING MECHANISM

BACKGROUND OF THE INVENTION

1. Field of the Invention

This invention relates to a disk apparatus for recording or reproducing a disk such as CD, CD-R, DVD, DVD-R, etc., and more particularly to a driving mechanism for the disk apparatus.

2. Description of the Related Art

A conventional disk apparatus is disclosed in JP-A-2000-11511 (page 3 to page 5, FIG. 1). In this disk apparatus, an apparatus body is provided with a tray for transferring a disk and a drive unit capable of ascending/descending in a direction substantially perpendicularly to the transfer direction of the tray. The drive unit is provided with a pickup unit having an optical pickup for recoding on or reproducing from the disk and a motor for moving the pickup unit in a radial direction of the disk.

A transmission means including a plurality of flat gears is attached to the motor, and transmits a decelerated driving force of the motor. The transmission means meshes with a rack formed on the pickup unit so that the pickup unit can be moved by the motor.

The transmission means is adapted to be capable of gearing with ascending/descending means. The ascending/descending means is cam-engaged with the drive unit so that it can move in a direction substantially orthogonal to the transfer direction of the tray and ascending/descending direction of the drive unit. Thus, the drive unit ascends or descends. Further, the transmission means is adapted to be capable of meshing with the rack formed on the tray so that the transmission means and tray are coupled with each other at a prescribed timing to transmit the driving force of the motor to the tray.

In the disk apparatus having the configuration described above, when the disk is placed on the tray, the tray is carried into the disk apparatus by driving the motor. When the tray is arranged at a prescribed position, the tray and transmission means are decoupled from each other so that the ascending/descending means and transmission means are coupled with each other. The ascending/descending means moves in a direction perpendicular to the transfer direction of the tray to raise the drive unit. Thus, the drive unit is engaged with the disk so that the disk is chucked.

When the disk is chucked, the transmission means and ascending/descending means are decoupled from each other, and the transmission means is coupled with the pickup unit. Thus, the pickup unit can be moved in a radial direction of the disk so that recording or reproducing can be carried out at a prescribed position of the disk. In taking out the disk, the operation inverse to that described above will be carried out.

However, according to the above conventional disk apparatus, since the flat gear is attached to the motor shaft of the motor to constitute the transmission means, the gear ratio cannot be large. This requires a large number of deceleration gears in order to position the optical pickup accurately at a prescribed position, which leads to a problem that the size of the drive unit becomes large.

SUMMARY OF THE INVENTION

An object of this invention is to provide a disk apparatus which can position an optical pickup accurately and can be downsized.

In order to attain the above object, this invention provides a disk apparatus including: an apparatus body; a chassis fixed to the apparatus body; a tray that moves with respect to the chassis to carry a disk; a drive unit that moves in a direction substantially orthogonal to a carrying direction of the tray with respect to the chassis to mount or dismount the disk placed on the tray; a pickup unit attached to the drive unit and having an optical pickup for recording or reproducing the disk, the pickup unit being movable in a radial direction of the disk; a plurality of gears arranged on the drive unit; a motor having a motor shaft and arranged on the drive unit to have an axial direction inclined with respect to a moving direction of the pickup unit, the motor driving the drive unit, the pickup unit and the tray through the plurality of gears; a worm gear having a lead angle of 15°–30° and attached to the motor shaft; a stacked gear including a worm wheel and a flat gear; and a gear arranged on the chassis and being in mesh with the gear arranged on the drive unit; wherein a feed of the tray coupled with the worm gear through the stacked gear is set at 1.5 mm–2.5 mm for each rotation of the worm gear; and a tooth width of the gear arranged on the chassis is set at 15 mm–30 mm.

This invention also provides a disk apparatus including an apparatus body; a chassis fixed to the apparatus body; a tray that moves with respect to the chassis to carry a disk; a drive unit that moves in a direction substantially orthogonal to a carrying direction of the tray with respect to the chassis to mount or dismount the disk placed on the tray; a pickup unit attached to the drive unit and having an optical pickup for recording or reproducing the disk, the pickup unit being movable in a radial direction of the disk; a plurality of gears arranged on the drive unit; a motor having a motor shaft and arranged on the drive unit to have an axial direction inclined with respect to a moving direction of the pickup unit, the motor driving the drive unit, the pickup unit and the tray through the plurality of gears; and a worm gear having a lead angle of 15°–30° and attached to the motor shaft.

According to this configuration, in mounting the disk, when the motor is driven, the tray with a disk placed thereon is carried through gear transmission. When the tray is located at a prescribed position, the drive unit ascends by motor driving to engage with the disk, so that the disk is chucked. After the disk has been chucked, by motor driving, the pickup unit moves in a radial direction of the disk. Thus, the disk can be recorded or reproduced using the optical pickup. On the other hand, in dismounting the disk, the operation reverse to the above operation will be performed. A worm gear having a lead angle of 15°–30° is attached to the motor shaft of the motor. In the case where the lead angle of the worm gear is more than 30°, the gear ratio becomes too small and controlling the operation becomes difficult. In the case where the lead angle of the worm gear is less than 15°, the motor shaft does not rotate smoothly when the tray is pushed manually, and thus a user cannot close the tray by hand. More specifically, in the case where the lead angle of the worm gear is less than 17°, closing the tray by hand becomes troublesome.

This invention also provides a disk apparatus including an apparatus body; a chassis fixed to the apparatus body; a tray that moves with respect to the chassis to carry a disk; a drive unit that moves in a direction substantially orthogonal to a carrying direction of the tray with respect to the chassis to mount or dismount the disk placed on the tray; a pickup unit attached to the drive unit and having an optical pickup for recording or reproducing the disk, the pickup unit being movable in a radial direction of the disk; a plurality of gears arranged on the drive unit; a motor having a motor shaft and arranged on the drive unit to have an axial direction inclined with respect to a moving direction of the pickup unit, the motor driving the drive unit, the pickup unit and the tray through the plurality of gears; and a worm gear having a lead angle of 15°–30° and attached to the motor shaft, wherein a movement of the pickup unit for each rotation of the worm gear is set at 0.6 mm–1.2 mm.

According to this configuration, a worm gear is attached to the motor shaft of the motor and a movement quantity of the pickup unit for each rotation of the worm gear is set at 0.6 mm–1.2 mm. The movement quantity of 1.2 mm or smaller permits the gear ratio to be increased, thereby positioning the optical pickup accurately. The movement of 0.6 mm or larger permits the power consumption of the motor to be suppressed without increasing the quantity of rotation of the motor when the optical pickup is positioned.

This invention also provides a disk apparatus including an apparatus body; a chassis fixed to the apparatus body; a tray that moves with respect to the chassis to carry a disk; a drive unit that moves in a direction substantially orthogonal to a carrying direction of the tray with respect to the chassis to mount or dismount the disk placed on the tray; a pickup unit attached to the drive unit and having an optical pickup for recording or reproducing the disk, the pickup unit being movable in a radial direction of the disk; a plurality of gears arranged on the drive unit; a motor having a motor shaft and arranged on the drive unit to have an axial direction inclined with respect to a moving direction of the pickup unit, the motor driving the drive unit, the pickup unit and the tray through the plurality of gears; and a worm gear having a lead angle of 15°–30° and attached to the motor shaft, wherein a transmission efficiency between the worm gear and a worm wheel in mesh therewith is set at 13%–28%.

According to this configuration, a worm gear is attached to the motor shaft of the motor and a transmission efficiency between the worm gear and a worm wheel in mesh therewith is set at 13%–28%. The transmission efficiency of 28% or smaller permits the gear ratio to be increased, thereby positioning the optical pickup accurately. The transmission efficiency of 13% or larger permits the motor shaft to be smoothly rotated when the tray is pressed manually.

This invention also provides a disk apparatus having the configurations described above, characterized in that a feed of the tray for each rotation of the worm gear is set at 1.5 mm–2.5 mm.

This invention also provides a disk apparatus having the configurations described above, characterized in that a tooth width of a gear arranged on the chassis in mesh with the gear arranged on the drive unit is set at 15 mm–30 mm. This configuration permits the drive unit to ascend/descend relatively to the chassis in such a manner that the gear at the final step attached to the drive unit ascends or descends with respect to the chassis in mesh with the gear arranged on the chassis.

This invention provides a disk apparatus having the configurations described above, characterized in that the motor is arranged to have an axial direction inclined with respect to the moving direction of the pickup unit.

This invention provides a disk apparatus having the above configurations described above, characterized by further comprising: a cam slider arranged on the chassis and being movable in a direction substantially orthogonal to a moving direction of the pickup unit; and a plate trigger attached to the drive unit to cause the drive unit to ascend or descend in cam-engagement with the cam slider; wherein the plate trigger and the cam slider respectively mesh with the gears coupled with the motor to thereby move together.

According to this configuration, the plate trigger moves through its cam engagement with the pickup unit, and the cam slider moves together with the plate trigger so that the cam slider can mesh with the gear. When the cam slider moves by gear driving, the drive unit which is cam-engaged with the cam slider through the plate trigger descends. In this case, during only a prescribed period, the plate trigger moves integrally to the cam slider in mesh with the gear so that the pickup unit cam-engaged with the plate trigger is locked.

BRIEF DESCRIPTION OF THE DRAWINGS

FIG. 8 shows a specification of one example of the disk apparatus;

FIG. 9 shows a specification of another example of the disk apparatus;

DETAILED DESCRIPTION OF THE PREFERRED EMBODIMENTS

Figure 1:
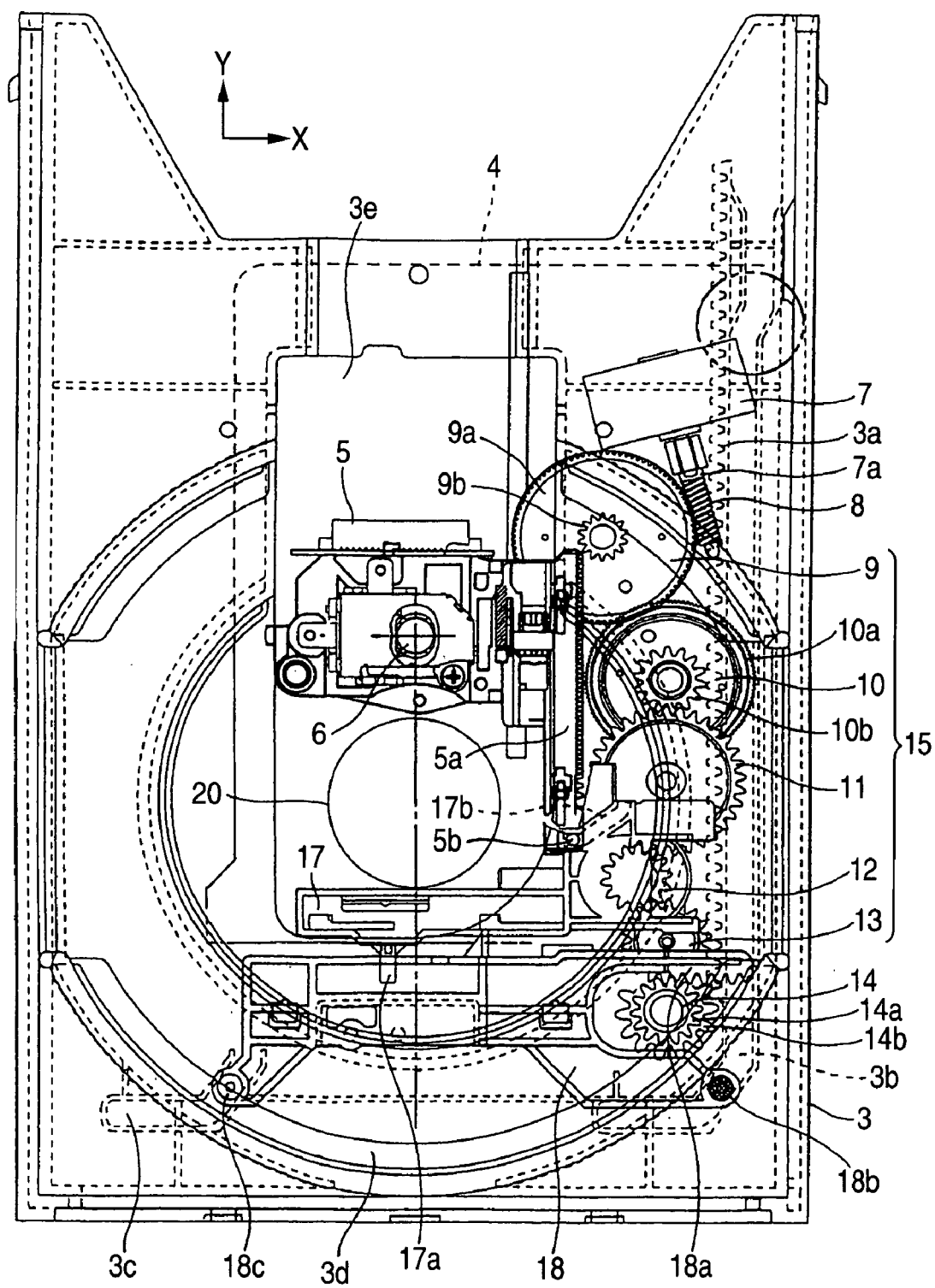
FIG. 1 is a top view showing a disk apparatus according to an embodiment of this invention.

Now referring to the drawings, an explanation will be given of a first embodiment of this invention. FIG. 1 is a plan view of a disk apparatus according to the embodiment of this invention. A chassis (not shown) is fixed to the disk apparatus 1. To the chassis are attached a tray 3 for transferring a disk moving in a Y direction with respect to the chassis and a drive unit 4 which is movable in a Z direction (direction perpendicular to the surface of the sheet of FIG. 1).

The drive unit 4 is provided with a chuck portion 20 capable of chucking the disk placed on the tray by the movement in the Z direction in engagement with a hole of the disk. The drive unit 4 is also provided with a pickup unit 5 having an optical pickup unit 6 located on a center line of the chuck portion 20. The pickup unit 5 is adapted to move in the Y direction so that the recording or reproducing of the disk is carried out by the optical pickup 6.

On one side of the pickup unit 5, a motor 7 and a transmission portion 15 including a plurality of gears for transmitting the driving force of the motor are arranged. The motor shaft 7a of the motor is arranged to have an inclining angle of 10°–20° from the Y direction. This permits the dead space of the drive unit 4 to be reduced and downsized.

A worm gear 8 having a lead angle of 15°–30° is attached to the motor shaft 7a of the motor 7. A worm wheel 9a, which is a lower gear of a double deceleration gear 9, meshes with the worm gear 8. A flat gear 9b, which is the lower gear of the deceleration gear 9, is able to mesh with a rack 5a formed on the pickup unit 5. In this way, the pickup unit 5 is driven by the motor 7.

The worm wheel 9a meshes with a worm wheel 10a which is a lower gear of a double or two-step deceleration gear 10, and is coupled with a flat gear 12 through a flat gear 10b which is an upper gear of the deceleration gear 10 and a flat gear 11. As described later, the flat gear 12 is able to mesh with a triangular tooth 17c (FIG. 2) of a plate trigger 17.

The flat gear 12 meshes with a flat gear 14a, which is a lower gear of a double or two-step tray gear 14, through a flat gear 13. The tray gear 14 is attached to the chassis. A flat gear 14b, which is an upper gear of the tray gear 14, is able to mesh with a rack 3a formed on the tray 3. In this way, the tray 3 is driven by the motor 7.

At the end of the drive unit 4, a plate trigger 17 having a cam protrusion 17a is arranged to be movable in an X direction. The plate trigger 17 has a triangular tooth 17c (FIG. 2) which is able to mesh with the flat gear 12. The plate trigger 17 has also a cam groove 17b which is engaged with a boss 5b formed on the pickup unit 5.

When the pickup unit 6 moves downward in FIG. 1, the plate trigger 17 moves rightwards in FIG. 1 by the engagement between the boss 5b and the cam groove 17b. When the plate trigger 17 moves leftwards in FIG. 1, the flat gear 9b and the rack 5a meshes with each other so that the pickup unit 6 moves upwards in FIG. 1.

Figure 7:
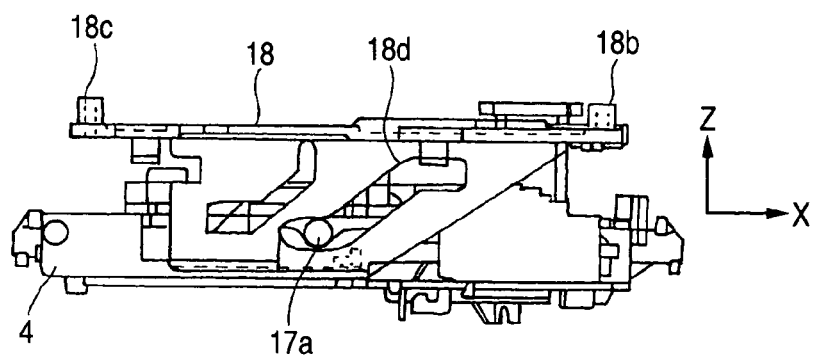
FIG. 7 is a front view of the state where the drive unit of the disk apparatus has descended.

On the chassis, a cam slider 18 is arranged oppositely to the plate trigger 17. The cam slider 18 is movable in the X direction by the motor 7 in such a manner that a rack 18a meshes with the lower flat gear 14a of the tray gear 14. The cam slider 18 has a cam groove 18d which is engaged with the cam protrusion 17a (FIG. 7).

When the cam slider 18 moves in the X direction, the drive unit 4 as well as the plate trigger 17 can ascend or descend in the Z direction. The cam slider 18 has protruded bosses 18b and 18c which are engaged with the cam grooves 3b and 3c of the tray 3 so that the tray 3 can be moved in the Y direction.

Figure 2:
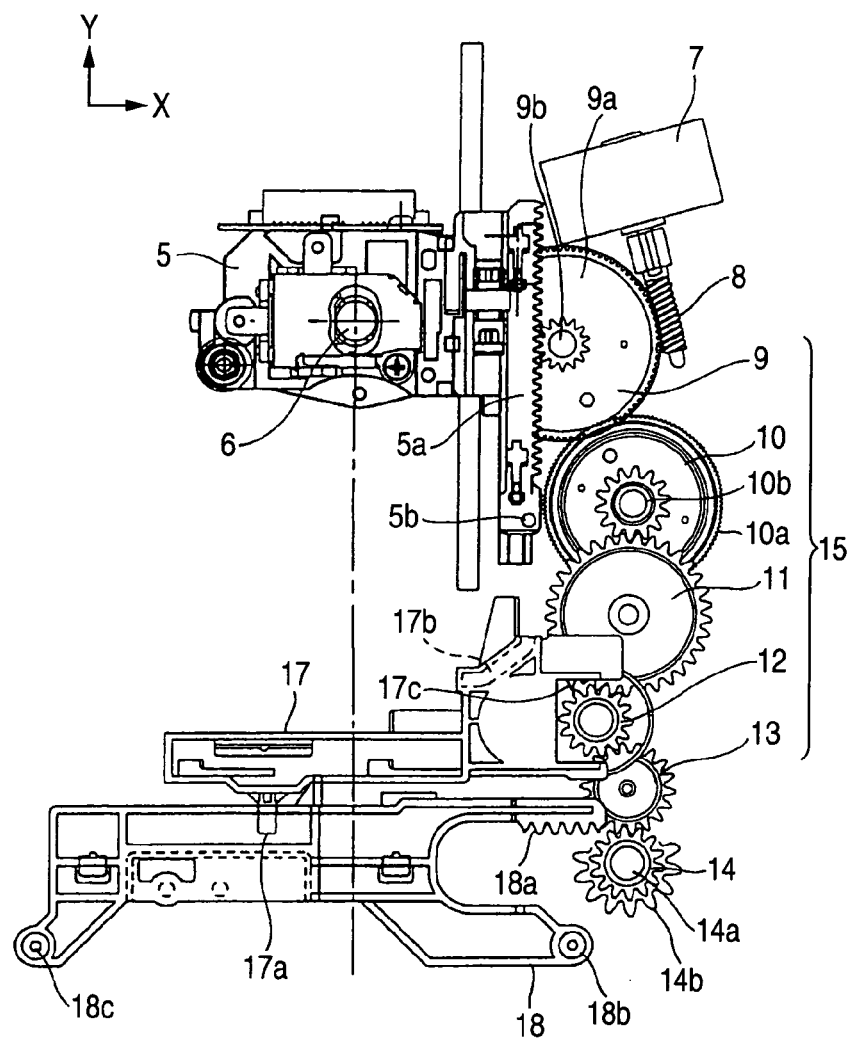
FIG. 2 is a top view for explaining the operation of the disk apparatus.
Figure 3:
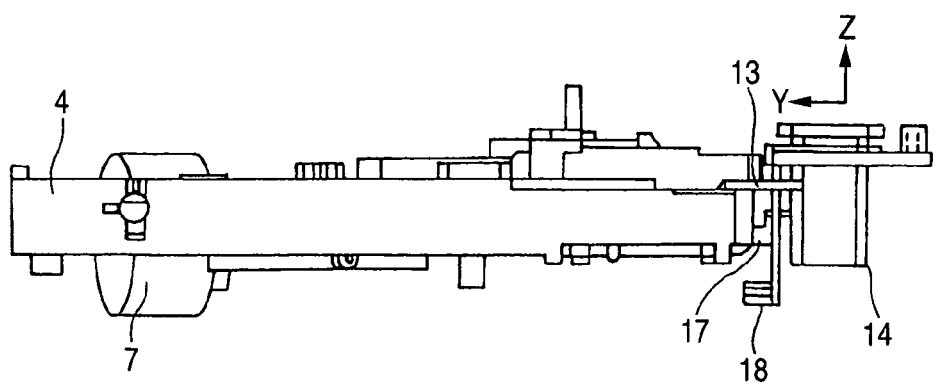
FIG. 3 is a side view of the state where a drive unit of the disk apparatus has ascended.
Figure 4:
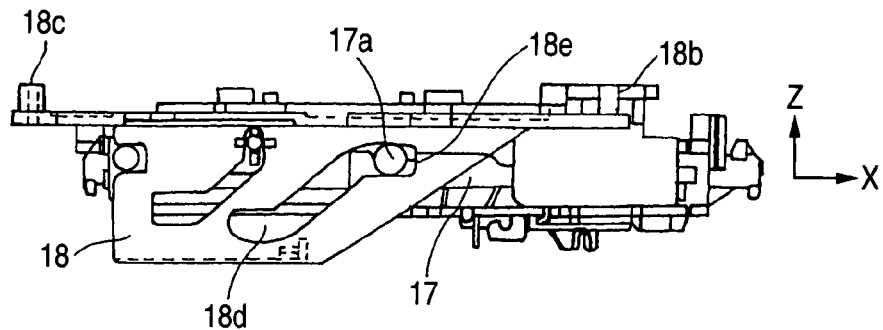
FIG. 4 is a front view of the state where the drive unit of the disk apparatus has ascended.

In the disk apparatus 1 having the above configuration, an explanation will be given of the operating of mounting or dismounting the disk. FIG. 2 is a plan view of the main portion of the disk apparatus 1 in a state where the tray 3 with the disk placed thereon has been carried into the disk apparatus 1. FIGS. 3 and 4 are a side view and a front view of the disk apparatus 1 in this state.

The rotation of the worm gear 8 attached to the motor shaft 7a rotatively drives each of the gears of the transmission portion 15 arranged in the drive unit 4 (FIG. 1) and the tray gear provided in the chassis (not shown). In the state where the disk is arranged in the disk apparatus 1, the flat gear 9b integral to the worm wheel 9a which meshes with the worm gear 8 meshes with the rack 5a of the pickup unit 5. Thus, the normal/reverse rotation of the motor 7 moves the pickup unit 5 in the radial direction of the disk (Y direction) reciprocatively so that the optical pickup 6 is arranged at a prescribed position.

At this time, the engagement between the boss 5b of the pickup unit 5 and the cam groove 17b of the plate trigger 17 is released, and the mesh between the triangular tooth 17c of the plate trigger 17 and the flat gear 12 is released. Further, the mesh between the rack 18a of the cam slider 18 and the tray gear 14 is released, and the mesh between the tray gear 14 and the rack 3a of the tray 3 is released.

In FIG. 4, the cam slider 18 is arranged relatively leftward. Because of the engagement between the cam protrusion 17a of the plate trigger 17 and cam groove 18d of the cam slider 18, the side on the tray gear 14 of the drive unit is raised from the chassis as seen from FIGS. 3 and 4. Thus, the disk is engaged with and chucked by the chuck portion 20 (FIG. 1).

Figure 5:
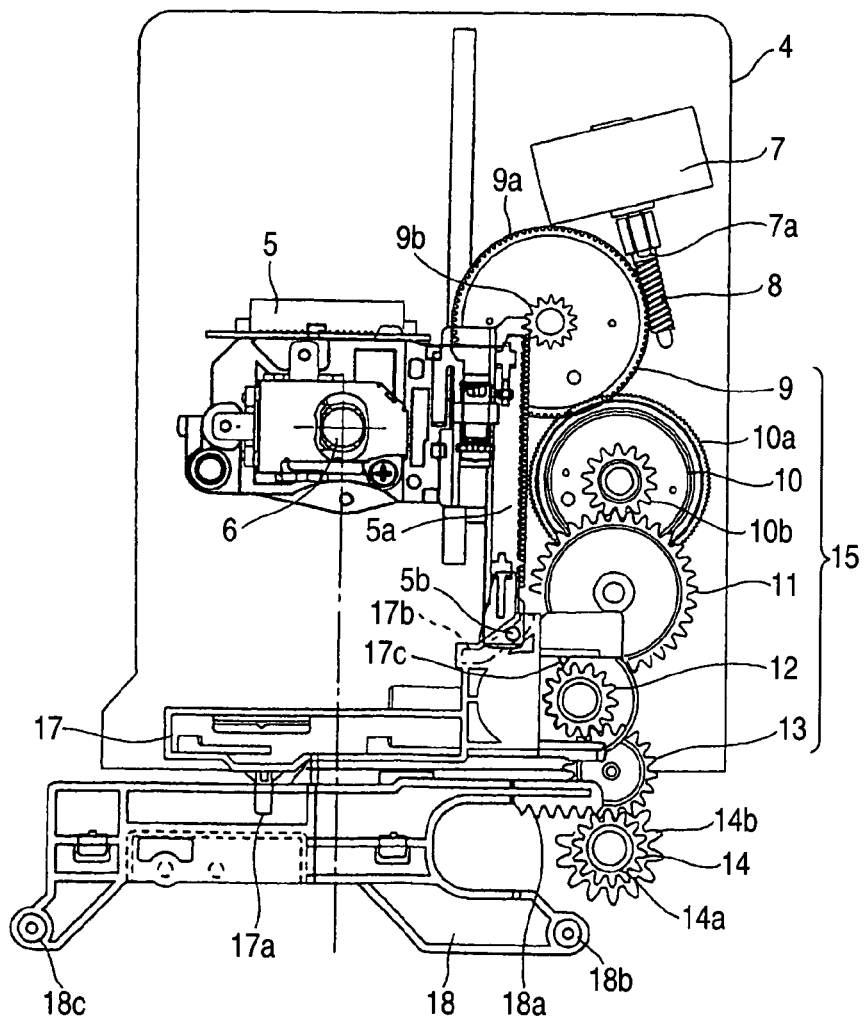
FIG. 5 is a top view for explaining the operation of the disk apparatus.

In taking out the disk, when the worm wheel 9a rotates counterclockwise in FIG. 2, the pickup unit 5 moves toward the plate trigger 17. As seen from FIG. 5, when the boss 5a of the pickup 5 is engaged with the cam groove 17b of the plate trigger 17, the plate trigger 17 is moved rightward in FIG. 5 by the guiding by the cam groove 17b.

Thus, the mesh between the triangular tooth 17 of the plate trigger 17 and the flat gear 12 is started and the mesh between the flat gear 9b of the deceleration gear 9 and the rack 5a is released. Because of the movement of the plate trigger 17, the cam protrusion 17a is brought into contact with the one end 18e of the cam groove 18d (FIG. 4).

The cam slider 18 moves integrally to the plate trigger 17 so that the rack 18a meshes with the flat gear 14a of the tray gear 14. Thus, the plate trigger 17 and the cam slider 18 are moved by driving the flat gear 12 and tray gear 14, respectively. In this case, the number of the teeth of each gear is prescribed so that the plate trigger 17 and the cam slider 18 move at the same speed.

When the boss 5a of the pickup unit 5 is arranged at the end of the cam groove 17b of the plate trigger 17, as shown in FIG. 1, the movement of the pickup unit 5 in the Y direction is locked. When the motor 7 further rotates, the mesh between the flat gear 12 and the triangular tooth 17c is released so that the cam slider 18 is moved solely in the X direction by the cam slider 18.

Figure 6:
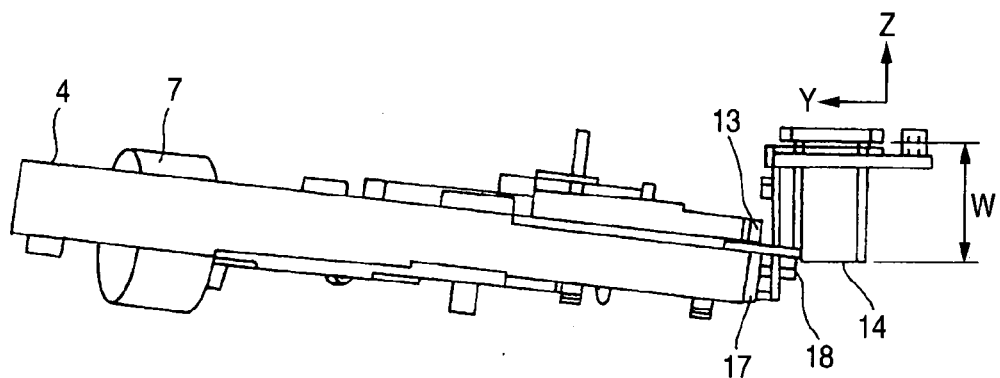
FIG. 6 is a side view of the state where the drive unit of the disk apparatus has descended.

Thus, the cam protrusion 17a of the plate trigger 17 is guided by the cam groove 18d of the cam slider 18. As seen from FIGS. 6 and 7, the drive unit 4 rotates to lower its one end. Thus, the engagement between the disk and chuck 20 (FIG. 1) is released so that the chucking of the disk is released.

Therefore, by moving the plate trigger 17 and the cam slider 18 integrally using the flat gear 12 and tray gear 14, after the pickup unit 5 has been locked, the drive unit 4 can be lowered. Thus, the accident due to swinging of the pickup unit 5 during e.g. transportation can be prevented.

When the cam slider 18 is moved, the bosses 18b and 18c of the cam slider 18 are guided by the cam grooves 3b and 3c so that the tray 3 is pushed out downward in FIG. 1. Thus, the mesh between the rack 3a of the tray 3 and the flat gear 14b of the tray gear 14 is started and the mesh between the flat gear 14a of the tray gear 14 and the cam slider 18 is released. The tray is taken out by rotation of the tray gear 14.

When the tray 3 is pressed manually for its carry-in, the motor shaft 7a rotates through the rack 3a of the tray 3, tray gear 14. transmission portion 15 and worm gear 8. Then, the start of the carry-in operation of the tray 3 is detected to drive the motor 7. Thus, the tray 3 is carried in by the operation opposite to the operation described above.

In accordance with this embodiment, since the worm gear 8 is provided at the first stage of the respective gears coupled with the motor 7, an increased gear ratio can be given. Therefore, without requiring the deceleration by a large number of gears, the pickup unit 5 can be positioned accurately through only the deceleration gear 9 composed of the worm wheel 9a and the flat gear 9b. Accordingly, the disk apparatus 1 can be downsized.

The lead angle of the worm gear 8 is preferably 15°–30°. The lead angle of 30° or smaller permits the gear ratio to be increased to position the optical pickup accurately. The lead angle of 15° or larger prevents the motor shaft 7a from being locked when the tray 3 is pressed manually, thereby permitting the motor shaft to be smoothly rotated.

Figure 10:
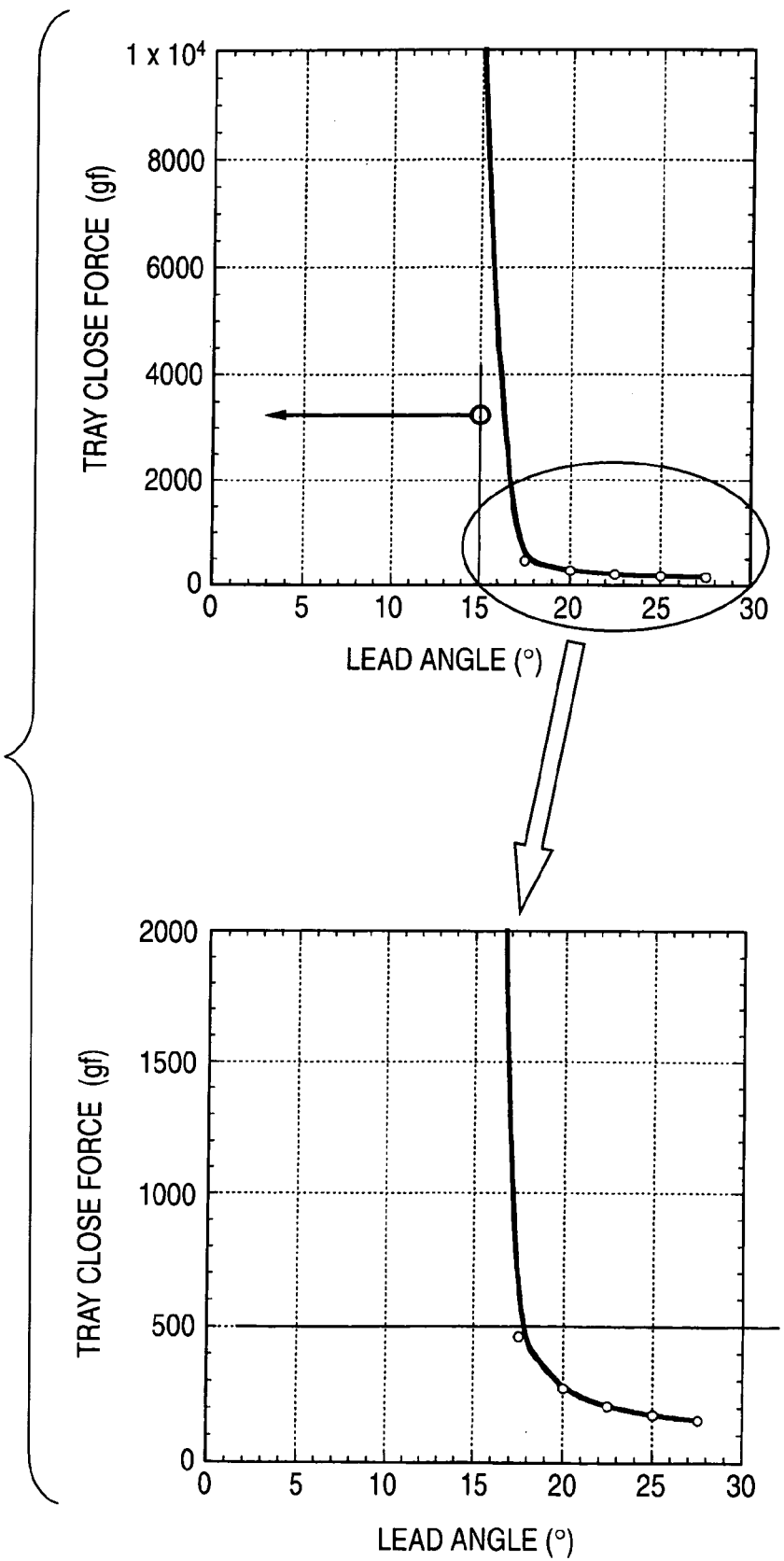
FIG. 10 is a graph showing a relationship between a lead angle of a worm gear and a force required for closing a tray (tray close force)

The relationship between the lead angle of the worm gear 8 and a force required for closing the tray (tray close force) is shown in FIG. 10. As can be seen from FIG. 10, as the lead angle decreases to 17°–18° or less, the tray close force rapidly increases. In the area where the lead angle is less than 15°, the tray cannot be closed manually.

The quantity of movement of the pickup unit 5 for each rotation of the worm gear 8 may be 0.6 mm–1.2 mm. The movement of 1.2 mm or smaller permits the gear ratio to be increased, thereby positioning the optical pickup 6 accurately. The movement of 0.6 mm or larger permits the power consumption of the motor 7 to be suppressed without increasing the quantity of rotation of the motor 7 when the optical pickup 6 is positioned.

The transmission efficiency between the worm gear 8 and the work wheel 9a may be 13%–28%. The transmission efficiency of 28% or smaller permits the gear ratio to be increased, thereby positioning the optical pickup accurately. The transmission efficiency of 13% or larger prevents the motor shaft 7a from being locked when the tray 3 is pressed manually, thereby permitting the motor shaft to be smoothly rotated.

The quantity of feed of the tray 3 for each rotation of the worm gear 8 is preferably 1.5 mm–2.5 mm. The feed of 1.5 mm or larger permits the lead angle or transmission efficiency of the worm gear 8 to be determined so that the motor shaft 7a is not locked when the tray 3 is pressed manually. The feed of 2.5 mm or smaller permits the gear ratio to be increased, thereby suppressing the power consumption of the motor 7.

The tooth width W (FIG. 6) of the flat gear 14a which is a lower gear of the tray gear 14 may be set at 15 mm–30 mm which is the ascending/descending distance of an ordinary drive unit. This tooth width permits the drive unit 4 to ascend/descend with respect to the chassis with the flat gear 13 arranged on the drive unit 4 at the final step being in mesh with the tray gear 14 arranged on the chassis. This permits the ascending/descending of the drive unit 4 and the carrying of the tray 3 to be performed simultaneously.

An explanation will be given of examples of this embodiment. FIG. 8 shows various items of each of the gears of the disk apparatus 1 according to a first example.

The lead angle of the worm gear 8 is set at 17.458°, and the feed of the pickup unit 5 (quantity of rotation of the flat gear 9b) for each rotation of the worm gear is set at 0.733. Thus, the optical pickup 6 can be positioned accurately.

Further, both the feed speeds of the plate trigger 17 and the cam slider are 1.248 mm (rotation quantity of the flat gears 12 and 14a) for each rotation of the worm gear 8. Thus, the plate trigger 17 and the cam slider 18 can be moved integrally at the same speed.

The feed quantity of the tray 3 (rotation quantity of the flat gear 14b) for each rotation of the worm gear 8 is 1.783 mm. Thus, the tray can be carried with reduced power consumption of the motor 7.

FIG. 9 shows various items of each of the gears of the disk apparatus 1 according to a second example.

The lead angle of the worm gear 8 is set at 20.252°, and the feed of the pickup unit 5 (quantity of rotation of the flat gear 9b) for each rotation of the worm gear is set at 0.733. Thus, the optical pickup 6 can be positioned accurately.

Further, both the feed speeds of the plate trigger 17 and the cam slider are 1.301 mm (rotation quantity of the flat gears 12 and 14a) for each rotation of the worm gear. Thus, the plate trigger 17 and the cam slider 18 can be moved integrally at the same speed.

The quantity of feed of the tray 3 (rotation quantity of the flat gear 14b) for each rotation of the worm gear 8 is 1.858 mm. Thus, the tray can be carried with reduced power consumption of the motor 7.

Figure 11A:
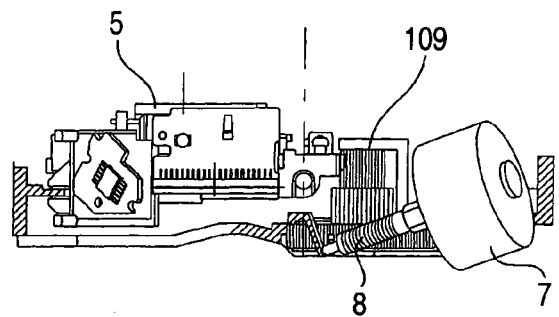
FIGS. 11A and 11B shows a disk apparatus according to another embodiment of this invention.
Figure 11B:
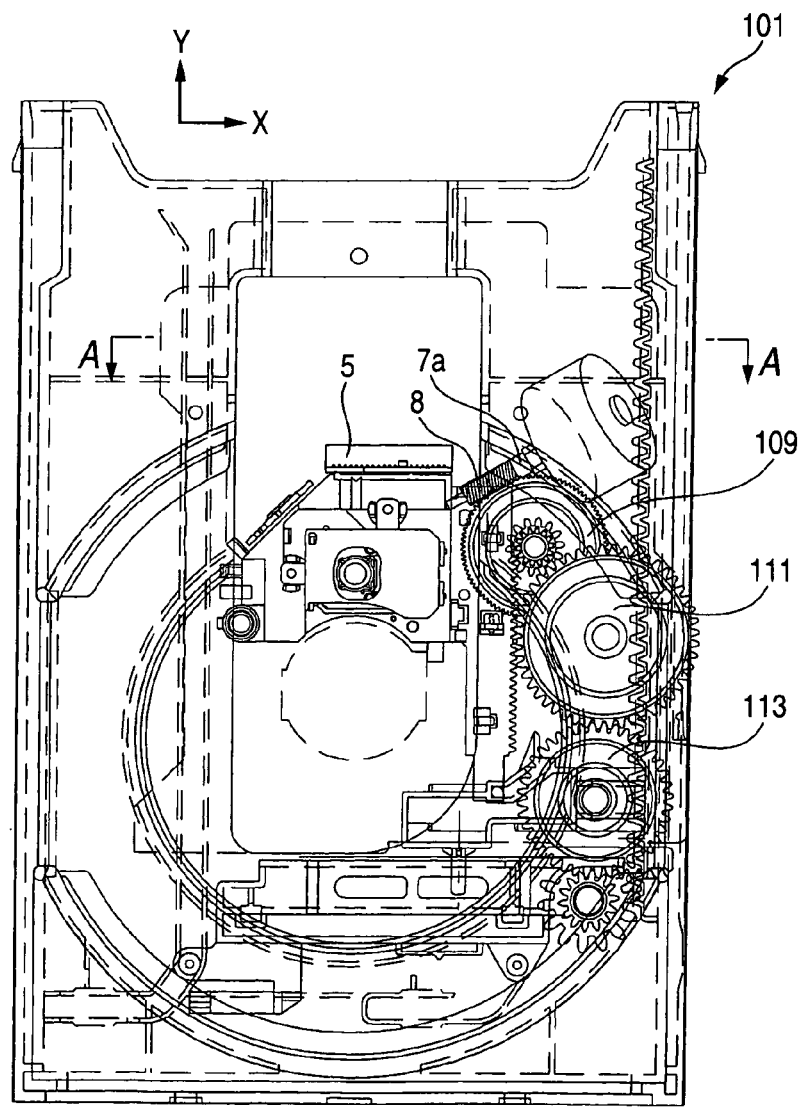

Subsequently, an explanation will be given of a second embodiment of this invention with reference to FIGS. 11A and 11B. FIG. 11A is a sectional view taken along line A—A in FIG. 11B, and FIG. 11B is a plan view of a disk apparatus. In these drawings, members and portions having the same functions as those in the first embodiment shown in FIG. 1 to 7 are denoted by the same reference numerals correspondingly, and description thereof will be omitted.

In this disk apparatus 101, a deceleration gear 10 and a flat gear 12 shown in FIG. 1 are omitted. Instead of the double or two-step deceleration gear 9 shown in FIG. 1, a deceleration gear 109 of a three-step gear as shown in FIG. 11A is used. Instead of the flat gears 11 and 13 shown in FIG. 1, flat gears 111 and 113 as shown in FIG. 11B are used.

In this disk apparatus 101, a motor shaft 7a of a motor 7 and a worm gear 8 are inclined by about −55°–70° with respect to the Y direction. That is, the motor shaft 7a and the worm gear 8 are inclined toward the side of a pickup unit 5 in a plan view. As shown in FIG. 11B, the motor shaft 7a and the worm gear 8 are inclined in a clockwise direction with respect to the Y direction. In the disk apparatus 1 shown in FIG. 1, the motor shaft 7a and the worm gear 8 are inclined in a counter clockwise direction with respect to the Y direction.

Further, in this disk apparatus 101, the motor shaft 7a and the worm gear 8 are inclined downward with respect to a horizontal direction as shown in FIG. 11A. The worm gear meshes with the lowest gear of the deceleration gear 109 having three steps.

According to this disk apparatus 101, the number of components is reduced and the apparatus can be downsized.

In accordance with this invention, a worm gear is attached to the motor shaft of the motor so that the gear ratio can be increased. Therefore, the pickup unit can be positioned accurately without requiring the deceleration using a number of gears, thereby downsizing the disk apparatus.

Further, the lead angle of 30° or smaller permits the gear ratio to be increased, thereby positioning the optical pickup accurately. The lead angle of 15° or larger prevents the motor shaft 7a from being locked when the tray 3 is pressed manually, thereby permitting the motor shaft to be smoothly rotated.

Further, the quantity of movement of 1.2 mm or smaller permits the gear ratio to be increased, thereby positioning the optical pickup 6 accurately. The movement of 0.9 mm or larger permits the power consumption of the motor 7 to be suppressed without increasing the quantity of rotation of the motor 7 when the optical pickup 6 is positioned.

The transmission efficiency of 28% between the worm gear and the work wheel permits the gear ratio to be increased, thereby positioning the optical pickup accurately. The transmission efficiency of 13% or larger prevents the motor shaft 7a from being locked when the tray 3 is pressed manually, thereby permitting the motor shaft to be smoothly rotated.

The feed of 1.5 mm or larger of the tray for each rotation of the worm gear permits the lead angle or transmission efficiency of the worm gear to be determined so that the motor shaft is not locked when the tray is pressed manually.

The feed of 2.5 mm or smaller permits the gear ratio to be increased, thereby suppressing the power consumption of the motor.

The tooth width of the gear arranged on the chassis in mesh with the gear arranged on the drive unit is set at 15 mm–30 mm which is the ascending/descending distance of an ordinary drive unit. This permits the ascending/descending of the drive unit 4 and the carrying of the tray 3 to be performed simultaneously in a simple configuration.

Further, in accordance with this invention, the axial direction of the motor is inclined from the moving direction of the pickup unit. For this reason, the dead space of the drive unit can be reduced, thereby downsizing the disk apparatus.

In accordance with this invention, the plate trigger and the cam slider can be moved integrally in mesh with the gears coupled with the motor. For this reason, after the pickup unit to be engaged with the plate trigger has been locked, the drive unit can be caused to ascend or descend. Thus, accidents due to swinging of the pickup unit during transportation can be prevented.

What is claimed is:

1. A disk apparatus comprising:
   an apparatus body;
   a chassis fixed to the apparatus body;
   a tray that moves with respect to the chassis to carry a disk;
   a drive unit that moves in a direction substantially orthogonal to a carrying direction of the tray with respect to the chassis to mount or dismount the disk placed on the tray;
   a pickup unit attached to the drive unit and having an optical pickup for recording or reproducing the disk, the pickup unit being movable in a radial direction of the disk;
   a plurality of gears arranged on the drive unit;
   a motor having a motor shaft and arranged on the drive unit to have an axial direction inclined with respect to a moving direction of the pickup unit, the motor driving the drive unit, the pickup unit and the tray through the plurality of gears;
   a worm gear having a lead angle of 15°–30° and attached to the motor shaft;
   a stacked gear including a worm wheel and a flat gear; and
   a gear arranged on the chassis and being in mesh with the gear arranged on the drive unit;
   wherein a feed of the tray coupled with the worm gear through the stacked gear is set at 1.5 mm–2.5 mm for each rotation of the worm gear; and
   a tooth width of the gear arranged on the chassis is set at 15 mm–30 mm.

2. A disk apparatus comprising:
   an apparatus body;
   a chassis fixed to the apparatus body;
   a tray that moves with respect to the chassis to carry a disk;
   a drive unit that moves in a direction substantially orthogonal to a carrying direction of the tray with respect to the chassis to mount or dismount the disk placed on the tray;
   a pickup unit attached to the drive unit and having an optical pickup for recording or reproducing the disk, the pickup unit being movable in a radial direction of the disk;
   a plurality of gears arranged on the drive unit;
   a motor having a motor shaft and arranged on the drive unit to have an axial direction inclined with respect to a moving direction of the pickup unit, the motor driving the drive unit, the pickup unit and the tray through the plurality of gears; and
   a worm gear having a lead angle of 15°–30° and attached to the motor shaft.

3. The disk apparatus according to claim 2, wherein a movement quantity of the pickup unit for each rotation of the worm gear is set at 0.6 mm–1.2 mm.

4. The disk apparatus according to claim 2, wherein a transmission efficiency between the worm gear and a worm wheel in mesh therewith is set at 13%–28%.

5. The disk apparatus according to claim 2, wherein a feed of the tray for each rotation of the worm gear is set at 1.5 mm–2.5 mm.

6. The disk apparatus according to claim 2, wherein a tooth width of a gear arranged on the chassis which is in mesh with the gear arranged on the drive unit is set at 15 mm–30 mm.

7. The disk apparatus according to claim 2, wherein the motor is arranged to have an axial direction inclined with respect to a moving direction of the pickup unit.

8. The disk apparatus according to claim 2, further comprising:
   a cam slider arranged on the chassis and being movable in a direction substantially orthogonal to a moving direction of the pickup unit; and
   a plate trigger attached to the drive unit to cause the drive unit to ascend or descend in cam-engagement with the cam slider;
   wherein the plate trigger and the cam slider respectively mesh with the gears coupled with the motor to there by move together.

9. The disk apparatus according to claim 2, wherein the worm gear has a lead angle of 17°–30°.

10. The disk apparatus according to claim 2, wherein the motor is arranged in a manner that the motor shaft is inclined toward a side of the pickup unit with respect to a moving direction of the tray.

11. The disk apparatus according to claim 10, wherein the motor is arranged in a manner that the motor shaft is inclined downward with respect to a horizontal direction.

* * * * *